(12) United States Patent
Brown et al.

(10) Patent No.: US 11,639,020 B2
(45) Date of Patent: May 2, 2023

(54) FREE BLOW BOTTLE DESIGN

(71) Applicant: Discma AG, Hünenberg (CH)

(72) Inventors: Jessica T. Brown, Ypsilanti, MI (US); Brad Krzyzaniak, Manitou Beach, MI (US); Corey Janes, Hillsdale, MI (US); Richard Sieradzki, Frankfort, IL (US)

(73) Assignee: DISCMA AG, Hunenberg (CH)

( * ) Notice: Subject to any disclaimer, the term of this patent is extended or adjusted under 35 U.S.C. 154(b) by 176 days.

(21) Appl. No.: 17/254,966

(22) PCT Filed: Jun. 24, 2019

(86) PCT No.: PCT/IB2019/000800
§ 371 (c)(1),
(2) Date: Dec. 22, 2020

(87) PCT Pub. No.: WO2020/002993
PCT Pub. Date: Jan. 2, 2020

(65) Prior Publication Data
US 2021/0162648 A1   Jun. 3, 2021

Related U.S. Application Data (60) Provisional application No. 62/691,670, filed on Jun. 29, 2018.

(51) Int. Cl.
*B29C 49/46* (2006.01)
*B29C 49/00* (2006.01)
(Continued)

(52) U.S. Cl.
CPC .......... *B29C 49/46* (2013.01); *B29C 49/0042* (2013.01); *B65D 1/0223* (2013.01);
(Continued)

(58) Field of Classification Search
CPC ..... B29C 49/02; B29C 49/0042; B29C 49/04; B29C 2949/0762; B29C 2949/0771;
(Continued)

(56) References Cited

U.S. PATENT DOCUMENTS

| 6,230,547 B1 | 5/2001 | Carroll, Jr. |
| 2015/0343695 A1 | 12/2015 | Chauvin et al. |
| 2016/0318229 A1 | 11/2016 | Drzewiecki et al. |

FOREIGN PATENT DOCUMENTS

| CN | 103097110 A | 5/2013 |
| CN | 104470699 A | 3/2015 |

(Continued)

OTHER PUBLICATIONS

Frank P. Leigner, "Free-blown PET preforms characterize blown bottles," Plastics Engineering, Jun. 1, 1985, pp. 47-51, vol. 41, No. 6, Brookfield Center, CT, US.

(Continued)

*Primary Examiner* — Monica A Huson
(74) *Attorney, Agent, or Firm* — Michael E. Dockins; Shumaker, Loop & Kendrick, LLP (57) ABSTRACT

An apparatus and method for simultaneously forming and filling a plastic container without the use of a mold forming a mold cavity (116, 16) is provided. A pressure source (120, 20) includes an inlet (146, 150, 46, 50) and a piston-like device (140, 40). The piston-like device (140, 40) is moveable in a first direction wherein liquid is drawn into the pressure source (120, 20) through the inlet (146, 150, 46, 50) and in a second direction wherein the liquid is urged toward the preform (112, 12). A blow nozzle (122, 22) may be adapted to receive the liquid from the pressure source (120, 20) and transfer the liquid at high pressure (P2) into the preform (112, 12) thereby urging the preform (112, 12) to freely expand until an unopened end thereof contacts a (Continued)

platen (118). The platen (118) forms a bottom in a resultant container. The liquid remains within the container as an end product.

19 Claims, 4 Drawing Sheets

(51) Int. Cl.
*B65D 1/02* (2006.01)
*B29L 31/00* (2006.01)

(52) U.S. Cl.
CPC .......................... *B29C 2049/465* (2013.01); *B29C 2949/0732* (2022.05); *B29C 2949/0733* (2022.05); *B29C 2949/0762* (2022.05); *B29C 2949/0771* (2022.05); *B29L 2031/7158* (2013.01)

(58) Field of Classification Search
CPC ............ B29C 49/06; B29C 2031/7158; B29C 2949/0733; B29C 2049/465; B29C 2949/0732; B65D 1/0223; B29L 2031/716
See application file for complete search history.

(56) References Cited

FOREIGN PATENT DOCUMENTS

| | | |
|---|---|---|
| EP | 0637499 A1 | 2/1995 |
| EP | 1366887 A1 | 12/2003 |
| FR | 2848906 A1 | 6/2004 |
| JP | H081760 A | 1/1996 |
| WO | 2012038652 A1 | 3/2012 |

OTHER PUBLICATIONS

F. M. Schmidt, J. F. Agassant, M. Bellet, "Experimental Study and Numerical Simulation of the Injection Stretch/Blow Molding Process," Polymer Engineering and Science, Sep. 1, 1998, pp. 1399-1412, vol. 38, No. 9, Brookfield Center, CT, US.

D. K. Lee, S. K. Soh, "Prediction of optimal preform thickness distribution in blow molding," Polymer Engineering and Science, Jun. 15, 1996, pp. 1513-1520, vol. 36, No. 11, Brookfield Center, US.

Bilal Demirel, "Optimisation of petaloid base dimensions and process operating conditions to minimize environmental stress cracking in injection stretch blow moulded PET bottles," Sep. 1, 2008, A dissertation submitted for the degree of Doctor of Philosophy, RMIT University, Melbourne, Australia.

FREE BLOW BOTTLE DESIGN

CROSS-REFERENCE TO RELATED APPLICATIONS

This application claims the benefit of U.S. Provisional Application No. 62/691,670, filed Jun. 29, 2018. The entire disclosure of the above application is incorporated herein by reference.

FIELD OF THE INVENTION

This invention relates broadly to the field of container design, and, more particularly, to the design and manufacture of plastic containers.

INTRODUCTION

During the last thirty-five years or so, there has been a dramatic shift in the packaging of liquid products, such as carbonated beverages, away from glass containers and toward plastic containers. The plastic containers initially took the form of a two-piece construction, wherein a base cup was applied to a plastic bottle having a generally hemispherical bottom to permit the bottle to be stood upright. The hemispherical bottom was seen as the most desirable shape due to an ease of repeatable manufacture and for retaining the pressure generated by the carbonation within the container. Pressures in such containers can rise to 100 pounds per square inch (psi) or more when the bottled beverage is exposed to the sun, stored in a warm room, car trunk, or the like. Such plastic containers represented a significant safety advantage over glass containers when exposed to the same internal pressures. However, the two-piece construction of the plastic containers was not economical because it required a post molding assembly as well as a separation step prior to reclaiming or recycling the resins forming the bottle and base cup.

As manufacturing techniques for plastic containers matured, the geometries thereof became more complex. Presently, plastic containers having ornate surface details, varying bottom/base shapes, handles, different cross-sectional shapes, and the like may be manufactured using various manufacturing techniques. Ornate plastic containers may be manufactured by reheat stretch blow molding, extrusion blow molding, roto-molding, and the like. Such techniques occur at a wide variety of temperatures and use various fluids as a blowing medium.

As the complexity of plastic container geometry has increased, a known method of designing the plastic containers has been adopted by the plastic container manufacturing industry. First, a concept is adopted for a need to be met by a new plastic container. Once a concept is determined, mechanical and digital renderings of the plastic container are generated by a design team. The mechanical and digital renderings take into consideration the appearance of the plastic container, the product intended to be contained therein, aesthetic considerations, the volume of product therein, shipping costs and/or logistics, container material costs, and other similar parameters.

Once the appearance of the plastic container has been decided, simulations are performed to determine how a particular preform used to form the plastic container may perform in manufacturing situations. The simulation will take under consideration a material the preform (and resulting container) is formed from, the length of the preform, the weight of the preform, the sidewall thickness and sidewall thickness profile of the preform and resulting container, and other desired parameters of the preform and/or the resulting container. The simulation is iterative, and any one or more of the aforementioned considerations is adjusted or modified until a desirable plastic container from a particular preform is simulated to meet the desired concept and resulting in a plastic container shown in the mechanical and digital renderings.

Once adequate simulations have been run, a small batch of plastic containers is manufactured to create actual plastic containers as reflected in the mechanical and digital renderings. Due to process variations concerning temperatures, handling of the preforms (heated or otherwise), blowing-fluid pressures, and the like, the resulting plastic container may not be acceptable. For example, in real-world process conditions, the plastic container may have unacceptable container wall thickness variations, striations or other unacceptable surface defects, or unacceptable performance in drop tests, stress tests, and other mechanical testing. These variations may be caused by the manufacturing parameters, which may be adjusted in an attempt to produce an acceptable plastic container or due to the materials or geometry of the preform used to manufacture the plastic container. These variations may also be caused by forcing the plastic material forming the preform to stretch and/or expand in directions or to an extent that causes damage to the polymer chains of the plastic material. Such overstretching of the plastic material of the preform may occur in either axial or radial directions wherein the resulting plastic container takes an undesired size and shape instead of the desired design or may result in a failed plastic container.

In order to produce an acceptable plastic container capable of mass manufacture, the simulation and small batch manufacture of plastic containers may be repeated numerous times with varying iterations and permutations of changes to process conditions, preform materials, and/or preform geometries. This iterative process is repeated until an acceptable and repeatable plastic container meeting the criteria of the initial concept and renderings is obtained, or until the entire process from concept and/or renderings through small batch manufacture is repeated. Often plastic containers are over-engineered with unnecessarily thick sidewalls or more expensive materials in order to more quickly produce a repeatable plastic container having a desired aesthetic. In this way, the plastic container design process is an inefficient "guess-and-check" methodology. This "guess-and-check" methodology results in increased costs to the plastic container manufacturer. As a result, the design of plastic containers may be expensive due to the required repetition of design steps and time consuming for the same reasons. Such inefficiencies in time and cost and material usage may delay or even prevent a particular plastic container, and product contained therein, from entering the stream of commerce in an efficient time period.

It would be desirable to develop an efficient method of designing plastic containers with desired parameters that minimizes a time and cost of developing and manufacturing the same.

SUMMARY OF THE INVENTION

Concordant and congruous with the present invention, an efficient method of designing plastic containers with desired parameters that minimize a time and cost of developing and manufacturing the same has surprisingly been discovered.

In an embodiment of the invention, a method of designing a plastic container is disclosed. The method includes the steps of designing a first container to be formed in a first process and forming a second container and a third container by a second process different from the first process. The method further includes the step of comparing a sidewall profile of the first container to a sidewall profile of the second container and a sidewall profile of the third container, wherein a difference between the sidewall profile of the second container and the sidewall profile of the first container are greater than a difference between the sidewall profile of the third container and the sidewall profile of the first container. The method includes the step of selecting a third container preform used to form the third container and employing a first container preform in the first process to form the first container. The first container preform has a preformed first container sidewall profile substantially equal to a preformed third container sidewall profile of the third container preform.

In another embodiment of the invention, a method of designing a plastic container includes the steps of providing a design of a container having a first sidewall profile and free blow molding a first preform having known dimensions to result in a free blown container having a second sidewall profile. The method additionally includes the steps of comparing the first sidewall profile of the design of the container to the second sidewall profile of the free blown container and repeating the free blow molding step using a second preform with different known dimensions or under different free blow molding conditions from the first preform to minimize a difference between the first sidewall profile of the design of the container and the second sidewall profile of the free blown container.

In yet another embodiment of the invention, a method of designing a plastic container includes the steps of providing a design of a plastic container having a first sidewall profile, determining specifications for the container, and providing a mold for forming the container in a blow molding process based on the specifications. The method also includes the steps of free blow molding a first preform having known dimensions to result in a free blown container having a second sidewall profile and comparing the first sidewall profile of the design of the container to the second sidewall profile of the free blown container. The method further includes the steps of repeating the free blow molding step using a second preform with different known dimensions or under different free blow molding conditions from the first preform to minimize a difference between the first sidewall profile of the design of the container and the second sidewall profile of the free blown container. The method includes the step of selecting one of the first preform and the second preform. The second sidewall profile of the free blown container formed from the selected one of the first preform and the second preform having less differences from the first sidewall profile of the design of the container than the differences between the second sidewall profile of free blown container formed from the other one of the first preform and the second preform and the first sidewall profile of the design of the container.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

"A" and "an" as used herein indicate "at least one" of the item is present; a plurality of such items may be present, when possible. As used herein, "substantially" means "to a considerable degree," "largely," or "proximately" as a person skilled in the art in view of the instant disclosure would understand the term.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
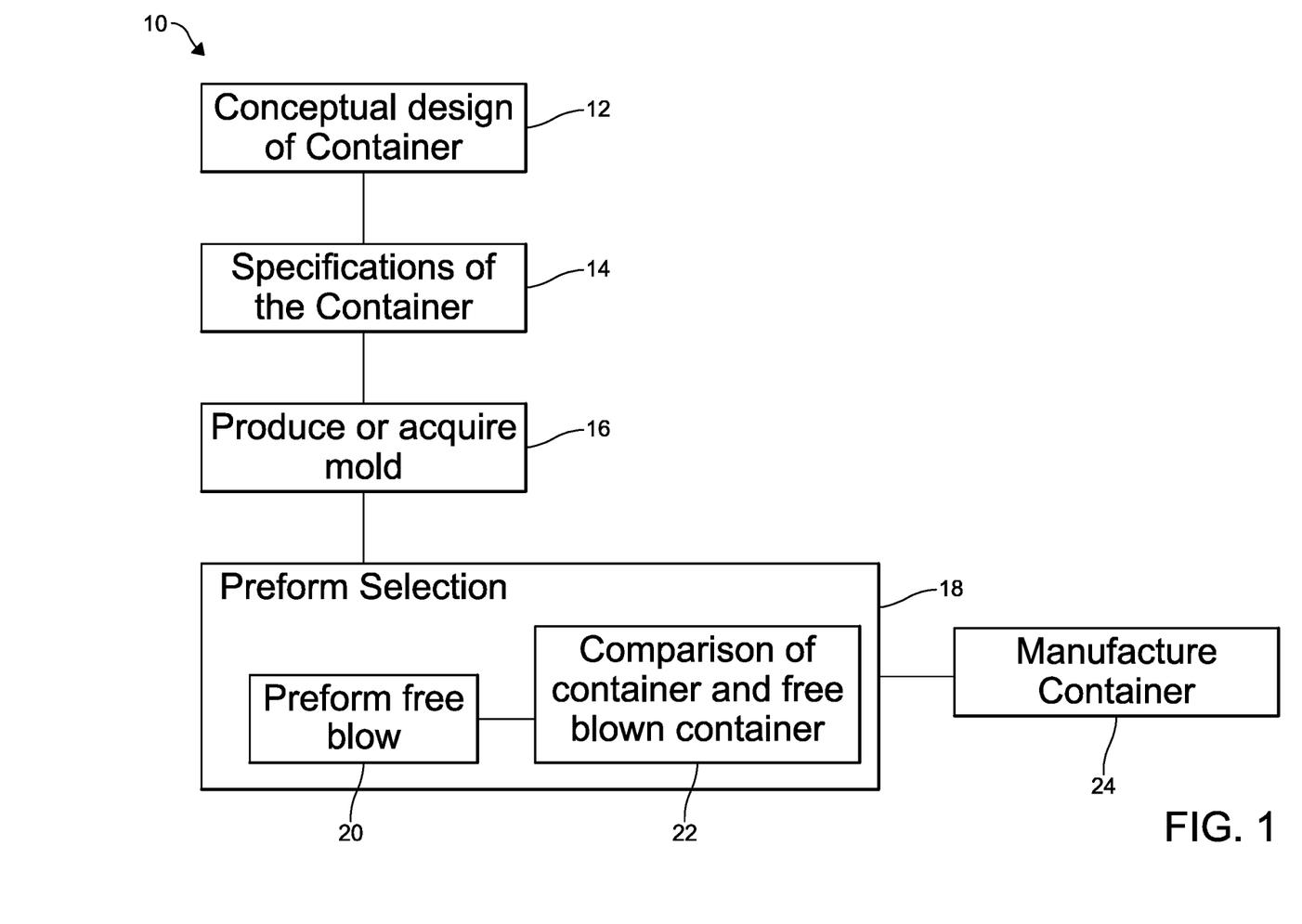
FIG. 1 is a flow chart of the steps of a method of designing a container according to an embodiment of the invention.
Figure 2:
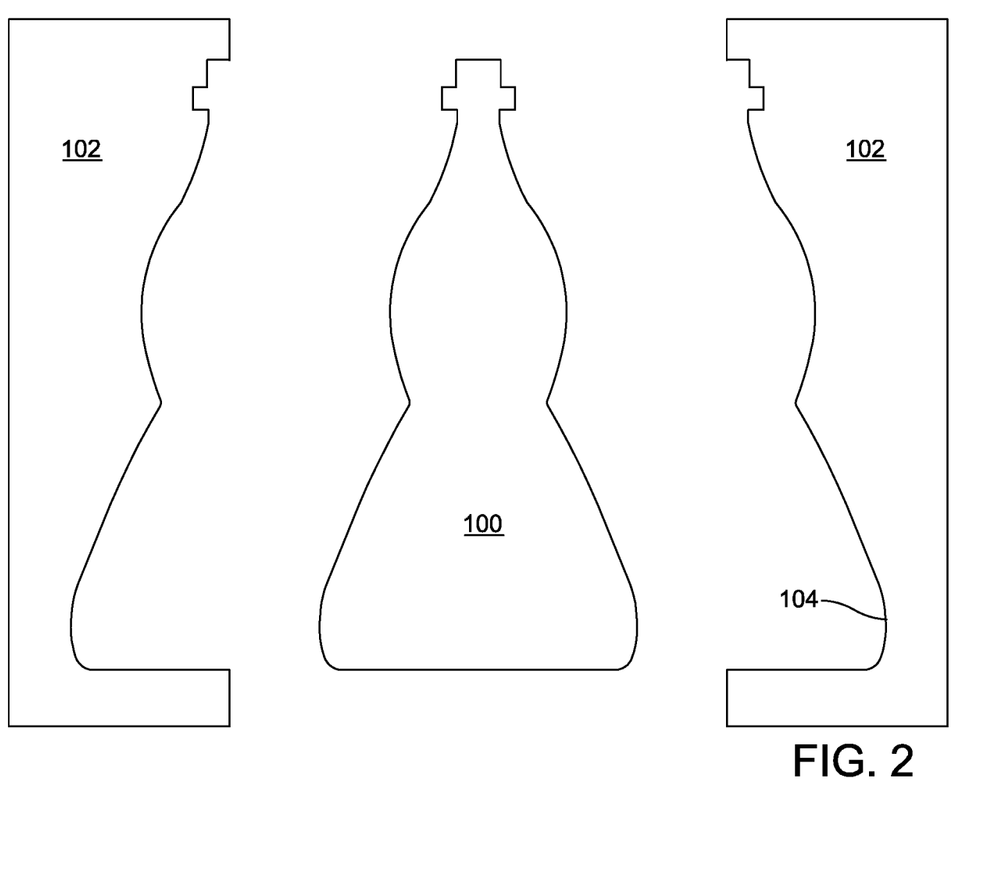
FIG. 2 is a front elevational cross-sectional view of a container and a mold in an open state, wherein the container is formed in and by the mold in a blow molding process according to the method of FIG. 1.

FIG. 1 shows a flow chart of a method 10 of designing a container 100 (as shown in FIG. 2) according to an embodiment of the invention. The container 100 is a hollow receptacle configured to hold a product such as a fluid, for example. As used herein the container 100 is a plastic container. However, it is understood a portion or an entirety of the steps can be employed to design containers formed from alternate materials such as glass or other materials as desired.

In a first step 12 of the method 10, a conceptual design of the container 100 is produced or otherwise obtained. The conceptual design may be a handmade drawing or a computer generated drawing such as produced by a design tool such as the CAD software suite. However, it is understood other types of medium, software, or three-dimensional renderings now known or later developed can be employed as desired. The container 100 will include aesthetic and/or functional features. For example, while not shown, the container 100 can include handles, grips, indentations, ripples, curvatures, dimples, other surface features, and the like, for example, as desired. The aesthetic and/or functional features of the container 100 may vary according to an end use of the container 100.

In a second step 14 of the method 10, specifications of the container 100 are determined to create an overall sidewall profile. As used herein the sidewall profile, refers to, but is not limited to, the overall three-dimensional shape of the container 100 which includes the overall dimensions of the container 100. The overall dimensions of the container 100 can include inner and outer widths, lengths, and heights, sidewall thicknesses, angles, radiuses of curvatures, and other similar criteria. The specifications can also include a desired weight of the container 100 when empty and a desired inner or outer volume of the container 100. In a third step 16 of the method 10, a mold 102 (see FIG. 2) is produced, acquired, or simulated using a computer simulation program based on the determined specifications.

As shown in FIG. 2, the mold 102 is formed from at least two separable parts. As illustrated, the mold 102 is in an open or separated position. When combined or in a closed or joining position, the two separable parts form a cavity 104. The cavity 104 corresponds in shape to a shape and a size of the resulting container 100.

With renewed reference to FIG. 1, in a fourth step 18 of the method 10, a preform 106 (see FIG. 3 for examples) is selected. As used herein, the preform 106 also sometimes referred to as a parison, is used to refer to a term used in blow molding processes, injection blow molding processes, or injection stretch blow molding process. However, it is understood the preform 106 can also be a term used in other processes such as extrusion blow molding or, for example. The preform 106 is formed from plastic and is a tube-like piece of plastic with a hole in one end through which fluid can pass. The preform 106 is then positioned within the mold 102 and the fluid is blown into the mold 102 to expand the plastic to match the contour of the cavity 104 of the mold 102. The preform 106 selected is typically based on weight and axial and radial stretch ratios obtainable by the preform 106 when reheated and blow molded to form the container 100. The preform 106 may have any desired shape, radius, wall thickness, weight, length, and/or height.

Figure 3A:
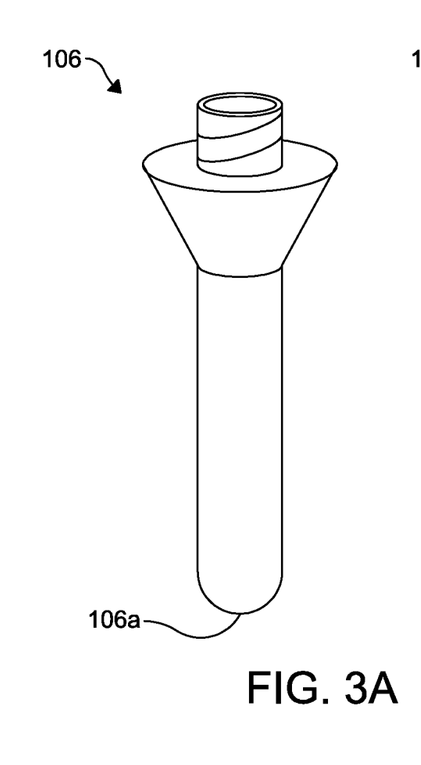
FIGS. 3A-3C are top perspective views of various examples of preforms employed for use in a blow molding process according to the method of FIG. 1.
Figure 3B:
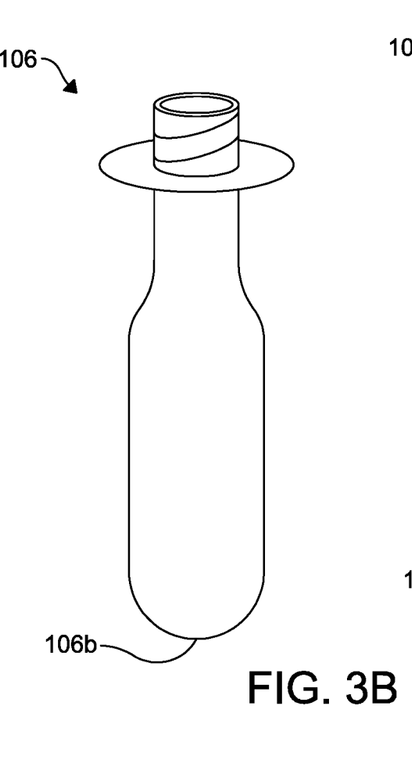
Figure 3C:
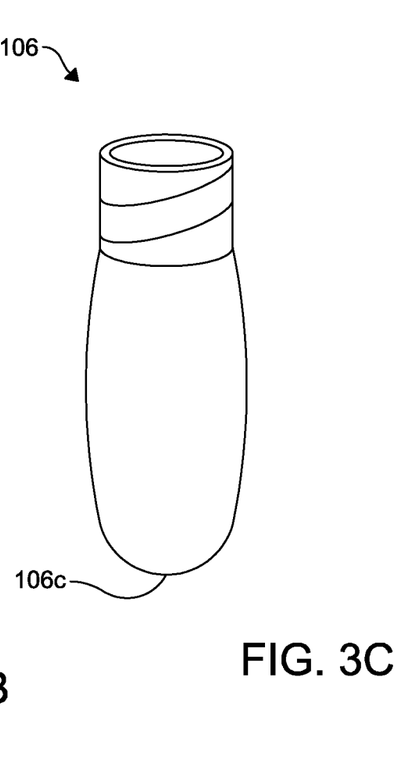

Examples of various ones of the preform 106 are shown in FIGS. 3A-3C. For example, the preform 106a in FIG. 3A is configured as a bell shaped preform. In another example, the preform 106b in FIG. 3B is configured as a reverse draft preform 106b. In yet another example, the preform 106c in FIG. 3C is a wide-mouth conical preform 106c. However, it is understood the preform 106 can be configured as any preform now known or later developed with any sidewall profile, cross-sectional or three-dimensional shapes as desired. The preform 106 may be formed from any material, as desired, that meets the known objectives of the resulting container 100. For example, suitable polymers from which the preform 106 and the container 100 may be formed include, but are not necessarily limited to, polyethylene terephthalate (PET) and other polyesters, polypropylene, acrylonitrile acid esters, vinyl chlorides, polyolefins, polyamides, and the like, as well as derivatives, blends, and copolymers thereof.

With renewed reference to FIG. 1, step 18 of the method 10 is a preform selection step. The preform 106 is selected according to a comparison of the shape of the resulting container 100 and a shape of a resulting container formed by a free blow molding or free blowing of a preform as described in more detail below. Step 20 of the method 10 is free blowing the preform 106. As shown, the step 20 of free blowing the preform may occur as a part of the preform selection step 18. However, in another embodiment the step 20 of free blowing the preform 106 may not be necessary as a part of the preform selection step 18 as the free blowing step 20 may have occurred prior to the method 10. For example, prior to the method 10, a profile of the preform 106 which may include a table, a graph, a chart, a formula, a mathematical correlation, or other index or reference guide of the previously-determined information related to a resulting free blown container formed from a particular preform may be available for reference and comparison to the container 100. The profile of the preform 106 may also include a range of fluid volumes that the resulting free blown container may be capable of holding. As a result, a known preform already free blown into a free blown container may be employed. That is, the preform free blowing step 20 may have occurred before the preform selection step 18 or even the conceptual design of the container step 12.

Free blowing of the preform 106 is a process by which the preform 106 is heated to equilibrium in an oven and then blow molded with a free blow medium such as a liquid, for example, without the use of a mold having a mold cavity. The preform 106 is allowed to take a shape as dictated by the pressure of the fluid, the volume of the fluid, the materials forming the preform 106, gravity, the temperature of the oven, and other process and preform variables.

Figure 4:
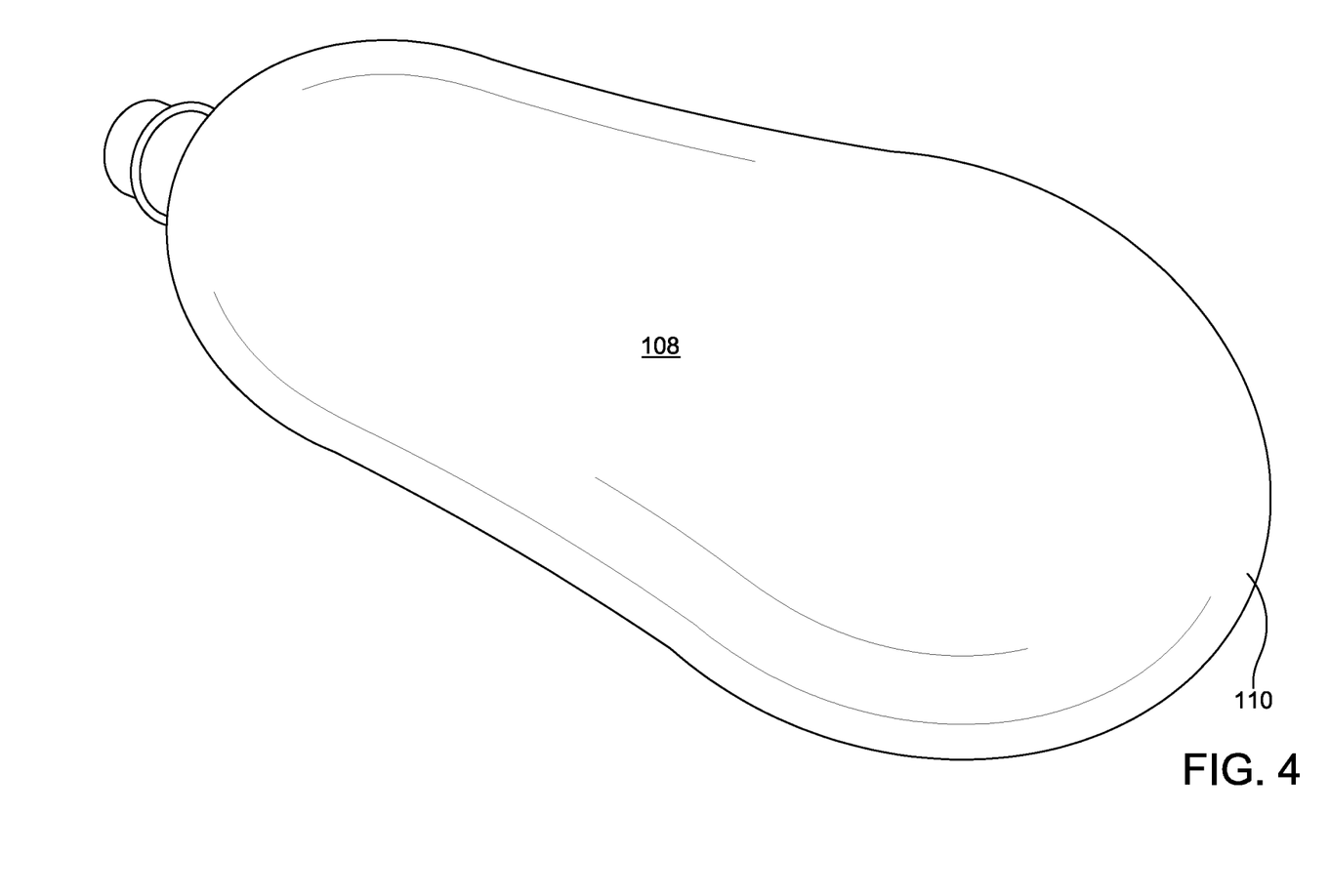
FIG. 4 is a bottom perspective view of a plastic container formed in a free blow molding process according to the method of FIG. 1.

A free blown container 108 resulting from the free blowing of the preform 106 formed using a liquid blowing medium (not shown) is illustrated in FIG. 4. The free blown container 108, because it is formed without the use of a mold, has a tear-drop shape and a closed rounded bottom 110. The free blown container 108 has a resulting sidewall profile. As noted above, various sidewall profiles of the free blown container 108 formed with the same preforms under different conditions may be generated. For example, free blowing a first preform of a known material and known dimensions under first parameters, such as a first temperature of the oven and a first pressure the free blow fluid, may result in a container having a different sidewall profile than free blowing a second preform with the same material and dimensions as the first preform under second parameters, such as a second temperature of the oven and a second pressure of the free blow fluid. Changing the parameters under which the preform is free blown assists in determining the free blown container 108 that has a similar sidewall profile as the container 100 and may also assist in creating the profile for the preform 106.

An acceptable one of the free blown container 108 will be substantially free from surface defects, unacceptable wall thickness variations, and/or holes or punctures. Also, the free blown container 108 will expand with a volume sufficient to contain a desired volume of a product therein. Additional profiles for the preform 106 may be generated by free blowing different weight or shaped preforms formed from different materials, having different lengths, wall thicknesses, diameters, and/or other material or dimensional variations and under different process conditions, such as temperature, fluid volume, blowing medium pressure, and the like. As described herein above, each different preform free blown under the various conditions and parameters or having the various differences in properties described herein will result in a different free blown container having its own unique inner volume (ie volume of the cavity) for containing the product, lengths, widths, shapes, diameters, wall thicknesses, wall thickness profile, angles, radiuses of curvatures, and other desired dimensions. In this way, a reference guide of free blown containers may be generated with the specific sidewall profile of the preform 106 used to form the free blown container 108 and the specific condition under which the preform 106 underwent to form the free blown container 108. Particularly advantageous of a reference guide is the ability to relate particular preforms to their maximum inner volume capability. As a result, a preform can be chosen to form a free blown container 108 that is capable of holding a desired volume of the product.

In step 22 of the preform selection step 18 of the method 10, a comparison of the container 100 and the free blown container 108 is performed. For example, a sidewall profile, shape, or outer contour of the free blown container 108 is compared to a shape or inner contour of the cavity 104 of the mold 102 or a sidewall profile, a shape or outer contour of the container 100. A difference between the sidewall profile of the free blown container 108 and the container 100 can be determined and minimized. The comparison of the free blown container 108 and the cavity 104 and/or the container 100 may happen physically by placing the free blown container 108 in or next to the cavity 104 of the mold 102 or the container 100, a design drawing of the mold 102 or the container 100, or the like. Additionally, the comparison may occur with the assistance of a computer modeling tool or spreadsheet, for example, wherein the cavity 104 of the mold 102 or the container 100 and the free blown container 108 specifications are entered therein and a difference therebetween can be computed.

In the comparison step 22, as the void space of the cavity 104 occupied by the free blown container 108 increases, the more likely the container 100 formed from the preform 106 that resulted in the free blown container 108 is to result in the container 100 having an acceptable appearance and acceptable performance capabilities. Similarly, if the free blown container 108 is compared to the container 100, as differences between the sidewall profiles, outer contours, and dimensions of the free blown container 108 and the container 100 are minimized, the more likely the container 100 formed from the preform 106 that resulted in the free blown container 108 is to result in the container 100 having an acceptable appearance and acceptable performance capabilities. The free blown container 108 may have dimensions larger than the container 100 wherein certain areas of the sidewall profile or the contour of the free blown container 108 may extend over the profile or the contour of the container 100, or the profile or the contour of the container 100 may extend over the free blown container 108. However, the end goal is to minimize such differences regardless which one of the containers 106, 108 extends past the other.

To minimize the differences, a preform different from the prior compared preform with different dimensions or parameters may be selected from the profiles made as referenced herein above, or a different preform may be free blown in the free blow step 20 and the comparison step 22 repeated. Alternatively, the free blow step 20 may be performed under different process conditions but with the same preform 106 prior to the comparison step 22. In this way, only the free blow step 20 is repeated, and the free blow step 20 is relatively quick and easy to perform as no mold or mold design is required. The free blow step 20 could initially involve the free blow molding of numerous and different preforms under numerous and different process conditions.

While numerous preforms and free blown containers selected from the reference guide of free blown containers may result in a container that is acceptable in its performance and aesthetics, minimizing the difference between the free blown container 108 and the cavity 104 or the container 100 itself will result in an optimized distribution of material forming the preform 106. Thus, the distribution of material of the container 100 is optimized resulting in minimal surface defects and a reduction in material costs and militates against over-engineering of the container 100.

Once the desired free blown container 108 design has been determined according to the methods described herein, the preform 106 used to form the desired free blown container 108 under the known conditions (e.g., temperature, fluid pressure, etc.) may be used to manufacture the container 100 in a step 24. The container 100 may be manufactured in either a small batch test or full-scale manufacturing under the conditions and parameters resulting with the free blown container 108 that most optimally overlapped with the container 100 in the comparison step 22 of the preform selection step 18.

In one embodiment, the free blown container 108 is obtained using liquid as the free blow medium. Once obtained, the free blown container 108 may be considered as verification that a particular container shape, volume, weight, dimensions and the like may be obtained using the preform 106, regardless of the blowing medium used to form the container 100. For example, once a particular container sidewall profile, shape, volume, weight, dimensions and the like obtainable using the preform 106 is verified by creating the free blown container 108 using liquid as the blowing medium, a design of the container 100 may be created that is based on the free blown container 108. The container 100 may then be mass produced from the preform 106 using air as a blowing medium, because the free blown container 108 provides verification that the preform 106 may be formed into the desired container 100 using other container forming processes. In this way, a designer may design the container 100 by first considering the characteristics of the preform 106, rather than iteratively designing the preform 106 to obtain the desired sidewall profile of the container 100.

By utilizing the methods of the instant invention, design of plastic containers becomes less iterative and based more on quantifiable and known parameters rather than a "guess-and-check" methodology. While known plastic container design methods involve creating a container and testing preforms to determine whether and how such a preform or process condition may be modified to result in a desired container, the present invention involves a method of creating a container and determining an acceptable preform to form the container based on how such a preform performs when free blown under known process conditions. The method of the instant invention is thus non-iterative in nature, and the time and cost to take a container from concept to manufacturing is minimized. Specifically, the time is reduced from months or weeks to days.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method of designing a plastic container comprising the steps of:
designing a first container to be formed in a first process;
forming a second container and a third container by a second process different from the first process;
comparing a sidewall profile of the first container to a sidewall profile of the second container and a sidewall profile of the third container, wherein a difference between the sidewall profile of the second container and the sidewall profile of the first container are greater than a difference between the sidewall profile of the third container and the sidewall profile of the first container;
selecting a third container preform used to form the third container; and
employing a first container preform in the first process to form the first container, the first container preform having a preformed first container sidewall profile substantially equal to a preformed third container sidewall profile of the third container preform.

2. The method of claim 1, wherein the first process is a blow molding process and the second process is a free blow molding process.

3. The method of claim 1, wherein the step of forming the second container and the third container by the second process is before the step of selecting the third container preform.

4. The method of claim 1, further comprising the step of providing specifications for the first container and providing a mold based on the specifications.

5. The method of claim 4, wherein the specifications include at least one of the dimensions of the first container and a weight of the first container when empty.

6. The method of claim 1, wherein the third container preform forms the third container under a set of third container process parameters, wherein a second container preform used to form the second container has a preformed second container sidewall profile and forms the second container under a set of second container process parameters, and wherein at least one of the preformed third container sidewall profile is different from the preformed second container sidewall and the third container process parameters is different from the second container process parameters.

7. The method of claim 6, wherein the third container process parameters and the second container process parameters include a temperature of an oven and a pressure of a fluid blowing medium used to form a respective one of the third container preform and the second container preform.

8. The method of claim 1, further comprising the step of forming a plurality of first containers with a plurality of the first container preforms.

9. A method of designing a plastic container comprising the steps of:
prov255ing a design of a container having a first sidewall profile;
free blow molding a first preform having known dimensions to result in a free blown container having a second sidewall profile;
comparing the first sidewall profile of the design of the container to the second sidewall profile of the free blown container; and
repeating the free blow molding step using a second preform with different known dimensions or under different free blow molding conditions from the first preform to minimize a difference between the first sidewall profile of the design of the container and the second sidewall profile of the free blown container.

10. The method of claim 9, further comprising the step of determining specifications for the design of the container.

11. The method of claim 10, further comprising the step of providing a mold based on the specifications for the design of the container.

12. The method of claim 9, wherein a profile of dimensions and free blow molding conditions of preforms is created for reference from data acquired from the free blow molding step and repeating the free blow molding step.

13. The method of claim 9, further comprising the step of selecting one of the first preform and the second preform, the second sidewall profile of the free blown container formed from the selected one of the first preform and the second preform having less differences from the first sidewall profile of the design of the container than the differences between the second sidewall profile of free blown container formed from the other one of the first preform and the second preform and the first sidewall profile of the design of the container.

14. The method of claim 13, wherein a preform sidewall profile and a free blow molding condition of the selected one of the first preform and the second preform are used to select a preform for forming the container in a mold.

15. The method of claim 14, wherein the preform sidewall profile and the free blow molding condition of the selected one of the first preform and the second preform are used to select a plurality of preforms for forming a plurality of the containers in a manufacturing process.

16. The method of claim 9, wherein the steps of free blow molding and repeating the free blow molding step are performed before the providing the design step of the container.

17. The method of claim 9, wherein the free blown container has a rounded bottom and is free from surface defects.

18. The method of claim 9, wherein the free blow step is performed using liquid as the free blow medium.

19. A method of designing a plastic container comprising the steps of:
providing a design of a plastic container having a first sidewall profile;
determining specifications for the container;
providing a mold for forming the container in a blow molding process based on the specifications;
free blow molding a first preform having known dimensions to result in a free blown container having a second sidewall profile;
comparing the first sidewall profile of the design of the container to the second sidewall profile of the free blown container;
repeating the free blow molding step using a second preform with different known dimensions or under different free blow molding conditions from the first preform to minimize a difference between the first sidewall profile of the design of the container and the second sidewall profile of the free blown container; and
selecting one of the first preform and the second preform, the second sidewall profile of the free blown container formed from the selected one of the first preform and the second preform having less differences from the first sidewall profile of the design of the container than the differences between the second sidewall profile of free blown container formed from the other one of the first preform and the second preform and the first sidewall profile of the design of the container.

* * * * *